United States Patent [19]
Dorst

[11] 3,757,206
[45] Sept. 4, 1973

[54] DIFFERENTIAL THERMOELEMENTS
[75] Inventor: Hans-Rudiger Dorst, Berlin, Germany
[73] Assignee: VEB Qualitats - und Edelstahl - Kombinat, Hennigsdorf/Kr. Oranienburg, Germany
[22] Filed: May 6, 1971
[21] Appl. No.: 140,750

[52] U.S. Cl. .................................. 324/32, 73/359
[51] Int. Cl. ............................................ G01k 7/02
[58] Field of Search ...................... 73/359, 295, 399, 73/61 LM; 324/32, 30, 71

[56] References Cited
UNITED STATES PATENTS
3,580,078  5/1971  MacKenzie .......................... 73/359
3,610,045  10/1971  Shearman ............................ 73/359
2,665,412  1/1954  Eding .................................... 324/71
2,714,190  7/1955  Pflasterer ............................. 324/32

Primary Examiner—Donald O. Woodiel
Attorney—Tab T. Thein

[57] ABSTRACT

Differential thermoelements for the indirect, quantitative determination of an alloying constituent in conductive melts having several constituents, the melt itself preferably forming the common leg of the thermoelement.

4 Claims, 3 Drawing Figures

PATENTED SEP 4 1973

3,757,206

INVENTOR.
HANS-RÜDIGER DORST

BY *Jab Thein*

AGENT

DIFFERENTIAL THERMOELEMENTS

The invention relates to differential thermoelements for the indirect, quantitative determination of an alloying constituent in conductive melts having several alloying constituents, the melt itself forming the common leg of the thermoelement. The difference in thermoelectric voltage resulting at a particular temperature of the melt is measured as an analog value on a voltmeter, for an indication of the amount of the one alloying constituent in the melt.

For the determination of admixtures in electrically conductive melts a differential thermoelement became known in which two thin-walled containers of high melting-point, or difficulty meltable, conductive material reach into the melt, which containers are filled with different, pure metals or with eutectic mixtures having different conductivities and melting temperatures. For measuring the difference of the thermo-electric voltages, the two containers are electrically interconnected by way of a voltage-measuring arrangement.

At the output of each container a thermo-electric voltage appears, depending on the prevailing material combination (melt against charge of the containers), the difference of said voltages constituting an indication of the momentary component of one alloying constituent of the melt.

Both thermo-electric voltages depend on the following influencing factors: a/ ambient temperature of the melt; b/ conductivity of the melt, subject to changes as the content in the alloying constituents changes; and c/ position of the container charge, used as a comparison electrode, against the melt itself, within the range of potentials.

From the voltage difference, the prevailing amount of the alloying constituent in the melt can be directly determined by the aid of special measuring-value transducers, or indirectly by comparison with calibration curves or diagrams of the applied thermoelements which of course have known material compositions.

This known arrangement has a number of drawbacks which considerably limit the use, applicability and measuring accuracy of the arrangement.

Thus when making quantitative determinations of admixtures or alloying constituents from a conductive melt, it is indispensable simultaneously to measure the melt temperature, for purposes of the actual determination of the thermo-electric voltage difference which represents the momentary alloying composition. This means that a temperature measuring device has to be installed in the range of the melt, in addition to the existing differential thermoelement, thereby increasing the expenditure of the instrumentation.

From the measuring-technical standpoint, another disadvantage follows which results from the fact that the temperature distribution in the melt displays a varying level at different locations thereof, and thus measuring inaccuracies and errors present themselves, since the measurement of the reference temperature has necessarily to be carried out at a location within the range of the melt, adjoining the differential thermoelement. The necessary prerequisite of fully identical conditions is not guaranteed for the two measurements.

Another disadvantage results from the application of thin-walled containers of high-melting metals. Besides the high initial costs of such materials, the danger presents itself that the melt is being alloyed in an undesirable manner with the high melting-point metals by dissolution and possible perforation of the thin-walled container or containers and thus unwanted penetration into the melt of the pure metals or eutectoidal mixtures serving as the thermoelement legs.

Furthermore the application of difficulty meltable metals as container materials substantially reduces the life performance of the differential thermoelements so that periodical measurements over an extended time period (continuous service) are practically excluded.

It is the object of the invention to avoid the drawbacks of the known arrangements, to improve the measuring accuracy of differential thermoelements, and to increase the life of the thermoelements for periodical measurements of thermo-electric voltage differences.

The problem solved by the invention relates to differential thermoelements for the indirect, quantitative determination of an alloying constituent in a conductive melt having several constituents, so that a melt-temperature measurement, being a prerequisite for the exact determination of the momentary alloying composition in close proximity of the differential thermoelement, is provided with the quantitative determination of the particular alloying constituent.

According to one of the important features of the present invention, a measuring-instrument carrier has an aperture in which a socket- or sleeve-shaped thermoelectrode of electrically conductive material is disposed, a second, rod-shaped electrode of similarly electrically conductive, but refractory material being secured in the former by means of an electrically insulating support ring; the rod-shaped thermoelectrode has one or more longitudinal bores closed with respect to the melt, a thermoelement being arranged at the bottom of said bores for purposes of measuring the melt temperature.

As a further, optional feature of the invention adjoining legs of the thermoelement are embedded at the basis of the longitudinal bores, and are electrically interconnected by the conductive, refractory material of the rod-shaped thermoelectrode.

It is furthermore possible, according to the invention, to provide a single thermoelement leg which is electrically connected with the rod-shaped thermoelectrode, the latter constituting by itself the second leg of the thermoelement.

The arrangement of the inventive differential thermo-elements offers the following advantages: several alloying constituents of a melt can be successively determined, even if their concentration changes; or simultaneously several constituents can be determined which latter change in a known relationship with respect to each other. By the provision of a rod-shaped thermoelectrode of an electrically conductive but refractory material the thermoelement serving for the temperature measurement is efficiently protected from the melt, the construction of such a thermoelement being considerably simplified. The life performance is strongly increased, simultaneously improving its measuring accuracy.

The thermoelements according to the invention permit short-time successive or continual determinations, during the melting process, of the changing alloying constituents of the melt and simultaneously the momentary temperature thereof.

These advantages yield the possibility of conducting more precisely the alloying process of a melt, and thus its temporal course, whereby the steel quality is considerably increased.

Other objects and many of the attendant advantages of the invention will be readily appreciated as the same becomes better understood by reference to the following detailed description, when considered with the accompanying drawing, wherein FIG. 1 is a longitudinal section through an exemplary differential thermoelement according to the present invention, with parts broken away;

Figure 1:
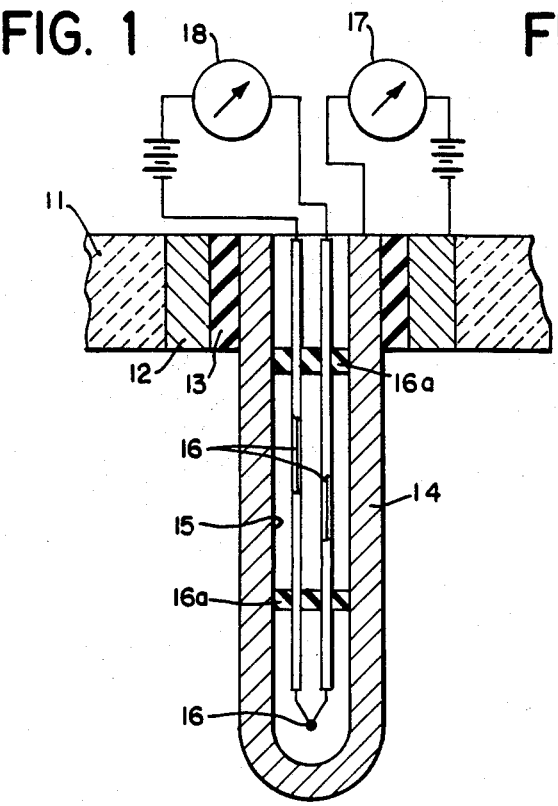
Figure 2:
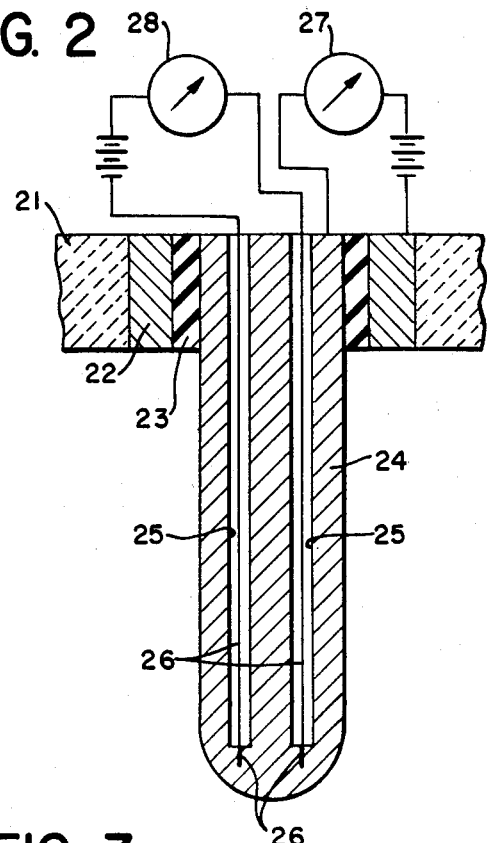
FIG. 2 is a similar illustration of another embodiment.
Figure 3:
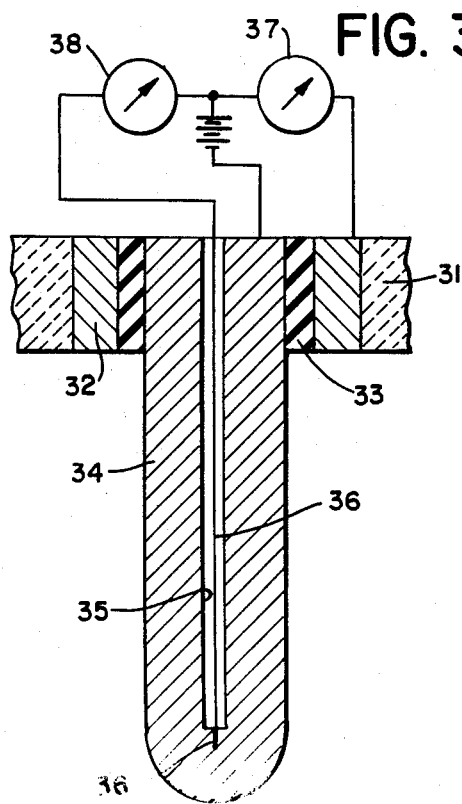
FIG. 3 is yet another exemplary differential thermoelement according to the invention.

By way of comparison it may be summarized that the first embodiment, shown in FIG. 1, has a rod-shaped thermoelectrode with a thermoelement for temperature measurement disposed in the longitudinal bore of the former; the second embodiment of FIG. 2 exemplifies two bores in the rod-shaped electrode, with a thermoelement inserted in both said bores; and FIG. 3 shows an arrangement where one leg of the thermoelement is constituted by the rod-shaped electrode proper.

Referring first to FIG. 1, a measuring-instrument carrier 11 is shown (partly broken away) which may be formed, as a matter of example, by an immersion lance head or directly by a wall of the furnace, having a socket or sleeve-shaped thermoelectrode 12 inserted therein, made from an electrically conductive refractory material. An electrically insulating support ring 13 is disposed between electrode 12 and a rod-shaped thermoelectrode 14 similarly made from an electrically conductive refractory material.

This could be a tungsten-rhenium alloy, graphite-treated fire clay, a ceramic substance, or electrically conductive high-melting metal oxides. Metallic sintered bodies made of carbides of difficulty meltable metals are adapted for this purpose.

Electrode 14 has a central, longitudinal bore 15 in which a conventional thermoelement 16 is disposed, braced against the inner walls by spacer members 16a. For measuring the temperature of the melt, element 16, of which the legs meet at the bottom of bore 15, is connected in a somewhat schematically shown circuit to a voltmeter 18 for measuring the thermo-electric voltage.

Electrodes 12, 14 constitute a differential thermoelement of which the common leg is formed by the melt proper. It should be remembered in this connection that electrode 14, which protrudes into the melt, is electrically conductive. Electrodes 12, 14 form a series connection, in the exemplary circuit arrangement, also including appropriate supply batteries, to a voltmeter 17, the measured voltage being indicative of the momentary alloying composition of the melt.

FIG. 2 shows the above-mentioned other embodiment, with a thermoelectrode 24 having two longitudinal bores 25 in which measuring wires of a thermoelement 26 are inserted, their lengths being electrically insulated from electrode 24. Parts 21 to 23 as well as 27 and 28 substantially correspond to the earlier-described parts 11 to 13, 17 and 18 of the first embodiment, respectively.

The neighboring thermoelement legs are embedded in electrode 24 at the ends of bores 25, and their ends are thus electrically connected by way of the material of the electrode.

In FIG. 3, showing another embodiment, parts 31 to 33 are similar to the earlier-described parts 11 to 13 and 21 to 23; in this case however instruments 37, 38 are in a common circuit with a battery, as will be understood by those skilled in the art.

A thermoelectrode 34 is shown which has a single longitudinal bore 35 in which is inserted a sole measuring wire of a thermoelement leg 36, electrically insulated all along with respect to electrode 34. The end of leg 36 is electrically connected with electrode 34 which itself forms the second leg, in the circuit of the meter 38, as can be readily visualized from the illustrated arrangement.

In this arrangement the two measuring circuits have a common thermoelectrode and thermoelement leg as well as a common measuring wire, constituting a simple differential thermoelement which is fitted with the earlier-described temperature measuring arrangement.

It should be understood, of course, that the foregoing disclosure relates only to preferred embodiments of the invention and that it is intended to cover all changes and modifications of the examples described which do not constitute departures from the spirit and scope of the invention.

Reference should be had, in closing, to a concurrently filed patent application, Ser. No. 140,716, entitled "Method and Apparatus for Determining the Alloying Percentage of a Constituent in Metallic Melts," by the present inventor and a co-inventor, Helmut Zielinski, with disclosure details which supplement the present application.

What I claim is:

1. A differential thermoelement combination for the indirect, quantitative determination of an alloying constituent in conductive melts having several constituents, comprising: a) a measuring-instrument carrier in the wall of a furnace and the like; b) a differential measuring unit including a first thermoelectrode of electrically conductive material disposed in an aperture of said carrier, and a second electrode of similarly electrically conductive but refractory material secured within said first electrode, a common leg between said electrodes being constituted by the melt in the furnace; insulating means between said electrodes, said second electrode having at least one longitudinal bore closed with respect to the melt; and c) a thermoelectric temperature measuring unit, physically within and operatively associated with said differential measuring unit, including a thermoelement arranged at the bottom of said at least one bore, insulated from the melt, for establishing the melt temperature; said measuring units being electrically connected to two voltmeters, one for said differential measuring unit between said electrodes, and the other for said temperature measuring unit between said thermoelement and said second electrode, the latter being common to said units; whereby exact determination of the momentary alloying composition is obtained in close proximity of said temperature measuring unit, the same allowing a melt-temperature measurement substantially simultaneously with a quantitative determination of the particular alloying constituent, the latter by way of said associated differential measuring unit.

2. The differential thermoelement as defined in claim 1, wherein said thermoelement has two legs, each being embedded at the basis of one of said at least one bore in the second electrode, said legs being electrically interconnected by the intermediary of said conductive refractory material of the second electrode.

3. The differential thermoelement as defined in claim 1, wherein said thermoelement has a single leg arranged inside a single bore of said second electrode and electrically connected therewith at its end, said second electrode constituting a second leg for said thermoelement.

4. The differential thermoelement as defined in claim 1, wherein the material of said second electrode is selected from the group of materials consisting of tungsten-rhenium alloys, graphite-treated fire clays, ceramic substances, and electrically conductive high-melting metal oxides.

* * * * *